Sept. 14, 1965 J. A. FITZMAURICE 3,206,725

SYSTEM FOR CHARACTER RECOGNITION

Filed July 6, 1961 5 Sheets-Sheet 1

INVENTOR.
John A. Fitzmaurice
BY
Morse & Altman

SYSTEM FOR CHARACTER RECOGNITION

Filed July 6, 1961 5 Sheets-Sheet 2

INVENTOR.
JOHN A. FITZMAURICE

INVENTOR.
John A. Fitzmaurice
BY
Morse & Altman

Sept. 14, 1965 J. A. FITZMAURICE 3,206,725

SYSTEM FOR CHARACTER RECOGNITION

Filed July 6, 1961 5 Sheets-Sheet 4

INVENTOR.
John A. Fitzmaurice
BY
Morse & Altman

Sept. 14, 1965 J. A. FITZMAURICE 3,206,725

SYSTEM FOR CHARACTER RECOGNITION

Filed July 6, 1961 5 Sheets-Sheet 5

INVENTOR.
John A. Fitzmaurice
BY
Morse & Altman

United States Patent Office 3,206,725 Patented Sept. 14, 1965

3,206,725

SYSTEM FOR CHARACTER RECOGNITION

John A. Fitzmaurice, Arlington, Mass., assignor to Baird-Atomic, Inc., Cambridge, Mass., a corporation of Massachusetts Filed July 6, 1961, Ser. No. 122,309
5 Claims. (Cl. 340—146.3)

Figure 1:
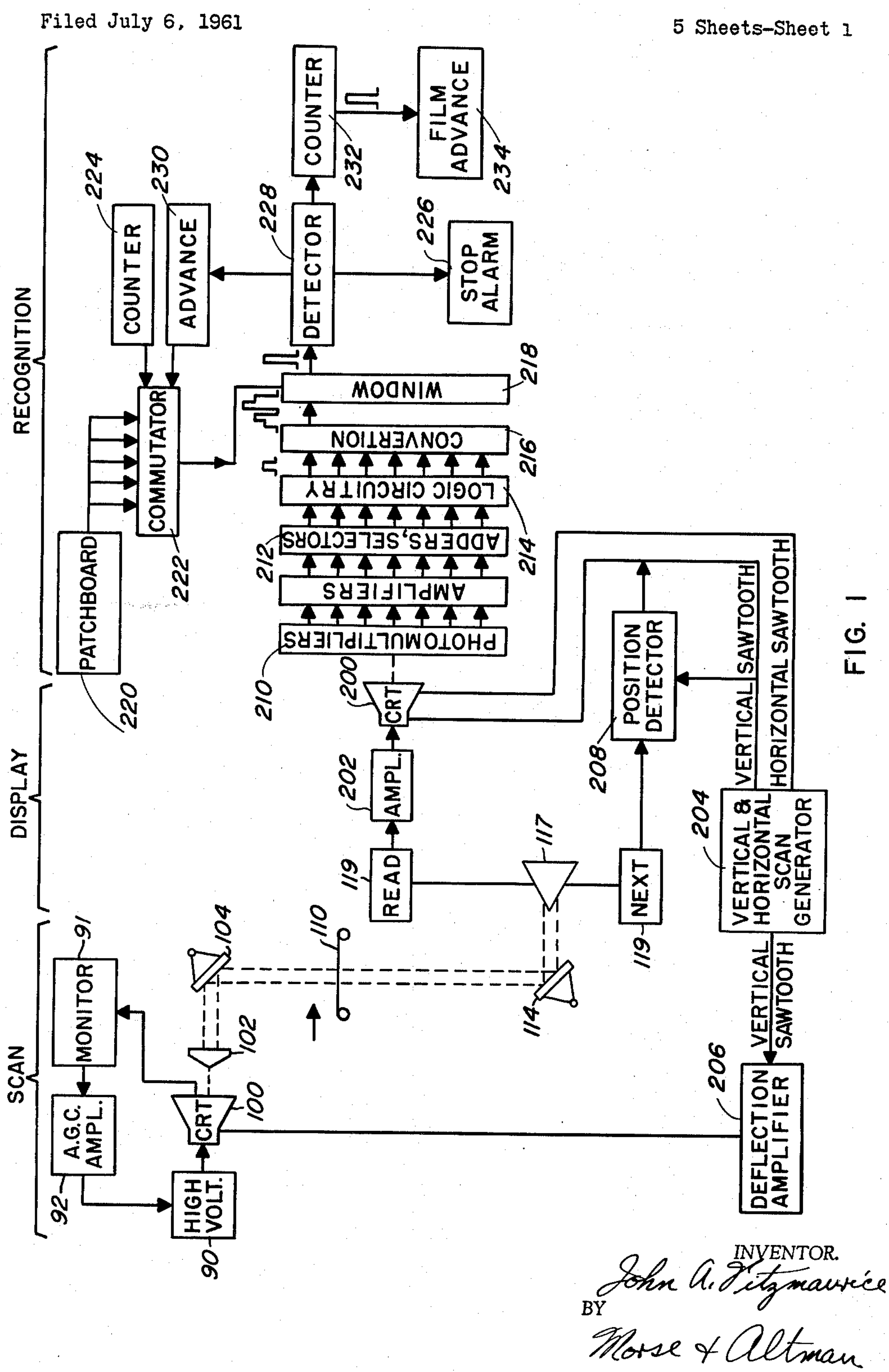

This invention relates in general to character recognition devices and more particularly concerns a novel electro-optical microfilm reader useful in document control work and related applications.

In handling large batches of serially numbered documents, present practice requires that each batch be visually checked to ensure that all documents have the same title and that they are numbered in consecutive order. Invariably, where a particularly large batch is involved, one or more documents go completely unaccounted despite numerous checks and cross checks. If the unaccounted document has any intrinsic value, it is important to determine whether or not it became lost through theft or carelessness or if it ever actually existed. It will be appreciated that a malfunction of a numbering machine could result in the omission of some numbers or, on the other hand, could result in the same number appearing on two separate documents.

In any event, existing document control systems have not proven to be entirely satisfactory and it is an object of the present invention to provide an automatic reading system capable of recognizing and responding to intelligence symbols to provide a positive check on the accuracy and completeness of a batch of serialized documents.

Another object of this invention is to provide an automatic microfilm reading apparatus of improved design in which novel scanning and display means are employed to properly present unknown intelligence symbols to a recognition section for logical identification.

Yet another object of this invention is to provide a novel microfilm reader for document control applications in which the output of an electro-optical scanning section is fed to a recognition section for comparison with artificially generated signals corresponding to predetermined reference characters.

More specifically, this invention features a microfilm reading apparatus in which unknown intelligence symbols are scanned by a vertically oscillating point of light and visually displayed on a cathode ray tube. The displayed character is then imaged simultaneously onto a set of photomultipliers covered by specially designed masks corresponding to preselected reference characters. The output of the photomultipliers is representative of both the masks and the unknown symbols and, by proper processing, will provide an identification of the symbol.

As another feature of this invention, each symbol in advance of the symbol displayed on the cathode ray tube is scanned by a second vertically oscillating point of light simultaneously with the displayed symbol. By this innovation, any vertical misalignment of the second symbol can be detected prior to its being displayed and suitable corrective measures can be taken to orient the symbol properly on the face of the cathode ray tube when that symbol is subsequently displayed.

As a modification of its primary embodiment, this invention also features a novel apparatus for scanning alphanumeric characters directly from their original opaque sheets.

Figure 2:
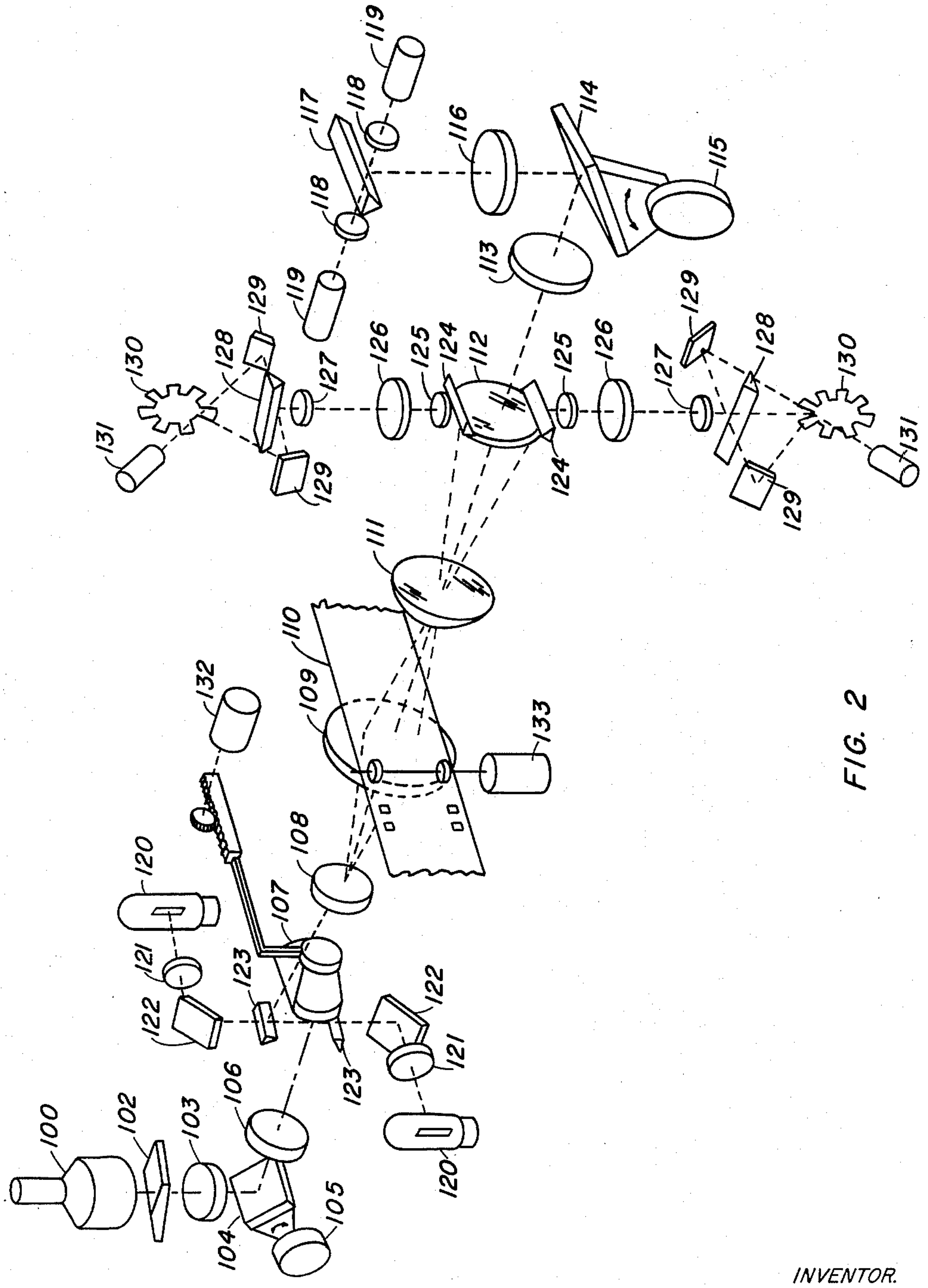
Figure 3:
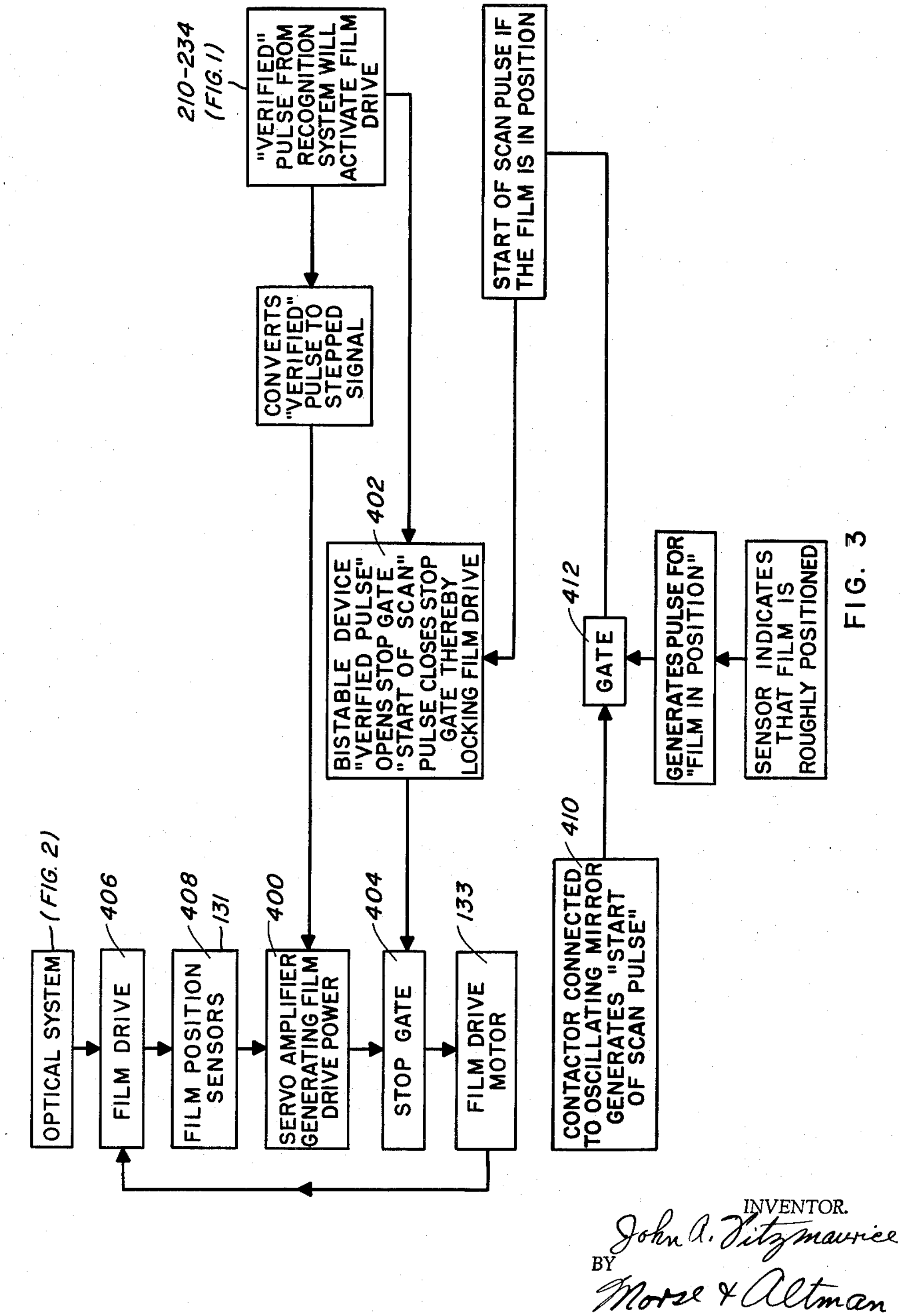
Figure 4:
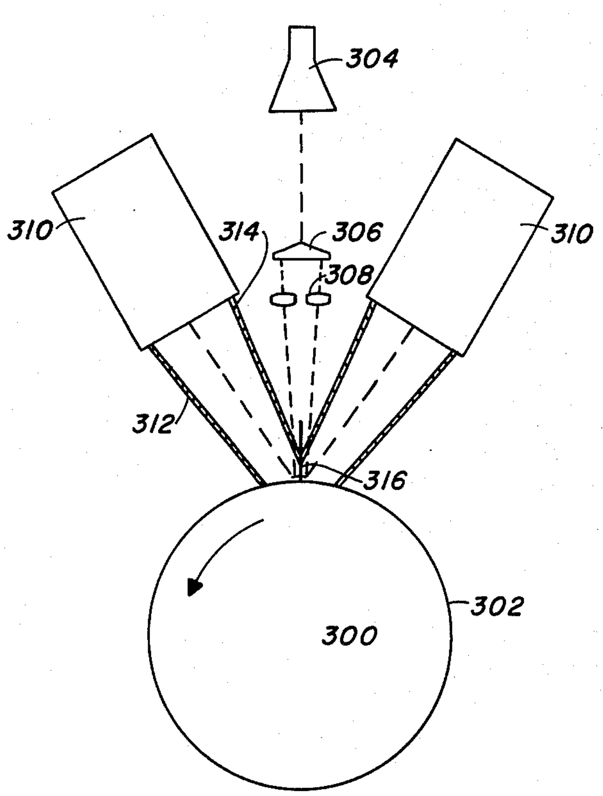
Figure 5:
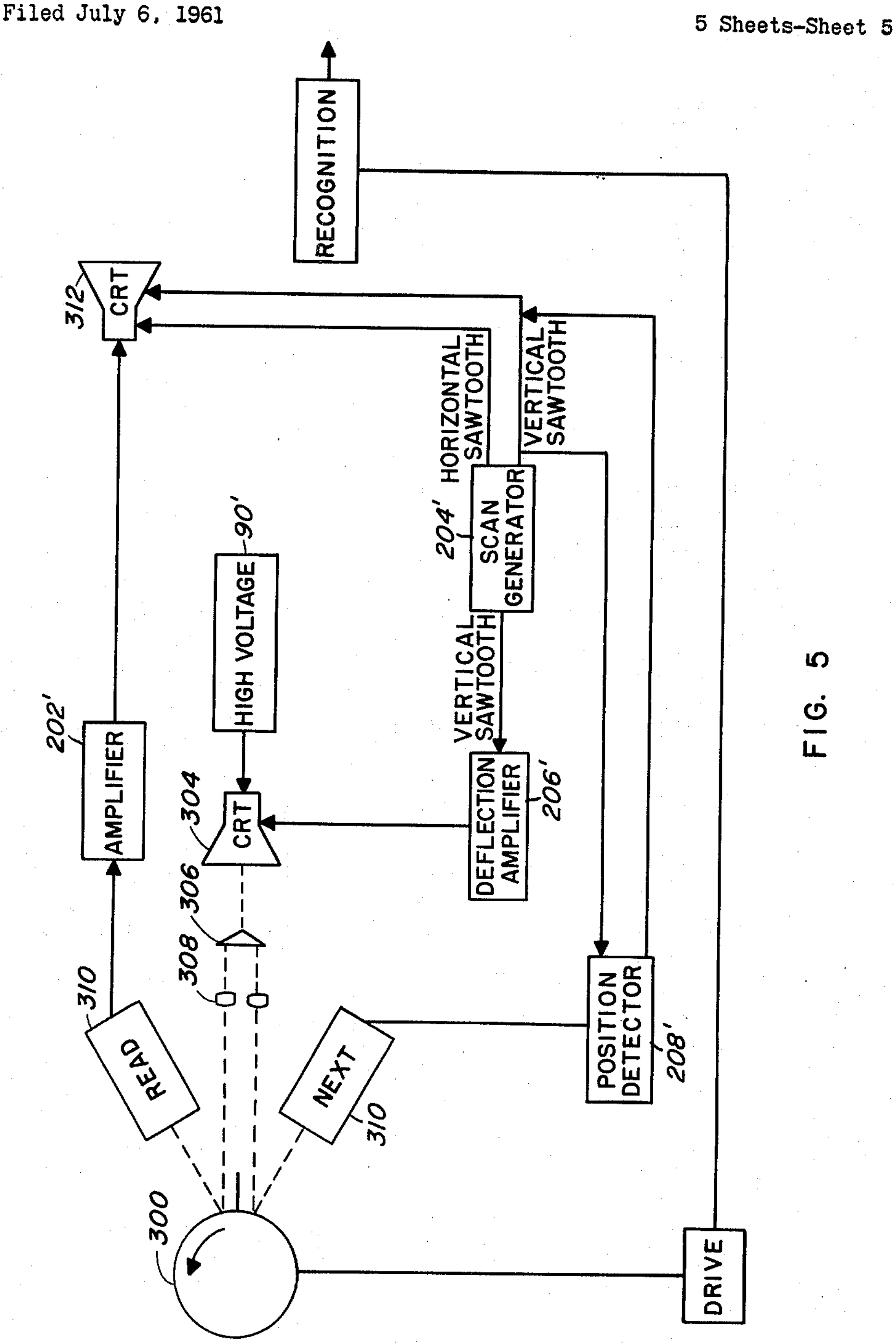

These and other features of the invention along with further objects and advantages thereof will become more fully apparent from the following detailed description taken in connection with the accompanying drawings in which:

FIG. 1 is a diagrammatic representation of a character recognition system made according to this invention, FIG. 2 is an exploded view in perspective, somewhat diagrammatic, showing the optical system in detail, FIG. 3 is a diagrammatic representation of the film control system, FIG. 4 is a top plan view of a scanning apparatus for use with opaque material, and FIG. 5 is a diagrammatic representation of the scanning and display portions of the opaque reader.

In order to understand clearly the function of the present invention, let us assume that it is necessary to catalogue and process a batch of, say, 10,800 separate documents, all of which should be consecutively numbered and bear the same title.

Customarily, these documents are photographed and, for convenience, the title and serial number will be read directly from the film by the reading machine rather than from the actual documents. A standard data recording camera may be used to photograph the documents. Preferably, this camera should be capable of taking pictures at an average rate of at least three frames per second. At this rate, the entire batch of documents mentioned above could be filmed in one hour if one frame is used for each document.

It is also desirable that the camera be able to accommodate up to 1000 feet of film so that at least a one hour run of documents can be handled on each reel. In order to achieve good resolution without wasting film, the short title and copy number should be printed on the documents, one above the other, and photographed together on a single frame of 35 millimeter film.

In addition, the camera should be provided with a frame counter which operates independently of the film drive sprocket so that the operator may readily determine that the number of frames exposed is equal to the apparent number of documents handled. Care should also be taken that no double exposures are made as a result of torn film. Automatic film processing equipment might be advantageously employed with the camera so that the film may be read in situ. Irregularities in document control may thereby be quickly detected and appropriate corrective measures taken without undue delay.

Referring now to the drawings, it will be observed in FIG. 1 that, for purposes of this description, the system has been divided into three main sections, with each section adapted to perform a specific function in the operation of the reader.

In general, the reader system may be considered as comprising a scanning section in which the unknown characters (microfilmed title and copy numbers of serially numbered documents, for example) are optically scanned by a small spot of light, a display section in which the scanned characters are sequentially presented on a cathode ray tube and a recognition section in which the displayed characters are electro-optically compared with known reference characters for purposes of identification.

The main optical components of the scanning section have been illustrated in detail in FIG. 2 and will now be described with an occasional reference to FIG. 1. In a preferred embodiment of this invention, a vertically oscillating point of light is generated by a cathode ray tube 100. The tube may be energized by a suitable high voltage power supply 300, the output of which is controlled by a monitor 301 and an amplifier 302 feed back system to ensure that the light emitted by the tube 100 will remain at a constant level. The cathode ray tube 100 should be adapted to produce a vertically oscillating scanning spot and may have a five inch face coated with a phosphorescent material of very short persistence.

The single oscillating line emitted by the tube 100 is split into two vertical lines by a prism 102 and both passed through a lens 103 constituting part of an image assembler in which a stationary component is added to the two scanning lines. This feature of the invention will be described in greater detail below. A first oscillating mirror 104, engaging a cam 105, directs the two scanning lines through a lens 106, a rotatable prism 107 and a relay lens 108, all part of the image assembler. From the lens 108 the scanning lines pass through a field lens 109 and onto a strip of film 110.

As indicated above, the film 110 will include a series of frames, with each frame bearing a photographic image of the title and serial number of a particular document. The textual material in each frame will normally be in the form of alphanumeric characters arranged in one or more lines across the width of the film. A servo motor 133 is provided to advance the film 110 after each line of text has been scanned and identified. According to this invention, the two oscillating points of light will scan two adjacent characters in a line of text on the film. Both characters will be scanned simultaneously from top to bottom starting at the left hand edge of each character. The image of the first character will be displayed and identified in other sections of the system while information obtained by the scanning of the succeeding adjacent character will be used to compensate for any vertical misalignment of that character when it is subsequently displayed.

From the film 110 the image of the two scanned characters are projected through a relay lens 111, the field lens of an image dissector 112, a relay lens 113 and against a second oscillating mirror 114 which is in operative engagement with a cam 115. The function of the second oscillating mirror 114 is to remove the scanning motion of the image at the image dissector. From this second oscillating mirror, the two vertical scanning lines are directed through a relay lens 116 to a prism 117 where the lines are divided and reflected in different directions. Light from each line is thereupon passed through a field lens 118 and onto a photomultiplier 119. The photomultiplier receiving light from the first or "read" character will provide video modulation for a display cathode ray tube 200. An amplifier 202 will normally be interposed between this display tube and its associated photomultiplier. The output from the other photomultiplier, which has received light passed through the second or "next" character, is used to obtain information about the vertical position of the character. This information is translated into a voltage and stored in a position detector 208 until the next character is due for display on the cathode ray tube 200. This voltage is used to bias the vertical deflection plates of the display tube with the result that the character will be correctly positioned on the face of the tube regardless of any vertical misalignment of the particular character on the film.

As shown in FIG. 1, a vertical and horizontal scan generator 204 supplies both the vertical and horizontal sawtooth components for the display cathode ray tube 200 with a connection provided between the vertical sawtooth lead and the position detector 208 for the purpose of vertical character alignment mentioned above. The generator 204 also supplies the vertical sawtooth to the cathode ray tube 100 with a deflection amplifier 206 provided as shown.

It will be understood that the vertical scan frequency is synchronized with the sweep frequency of the optical scan cathode ray tube 100 and the horizontal scan frequency coincides with the character reading frequency. In this way, a sequence of single characters appears on the face of the display cathode ray tube 200.

Referring again to FIG. 2 the auxiliary optical system for the image assembler, briefly mentioned above, will now be described in detail. The principal function of the assembler is to add a stationary component to the two scanning lines whereby a skewed condition of a sequence of characters on the film may be corrected. For convenience, registration marks in the form of short line segments (opaque against a transparent field or vice-versa) may be placed to the left and to the right of each sequence of character to be read. In the auxiliary optical system, a pair of ribbon filament lamps 120 separately illuminate the registration marks with each lamp projecting a spot of light through a lens 121 against a fixed mirror 122, through a 90° prism, a rotary prism 107, the relay lens 108, the field lens 109 and onto the film 110. The two light spots from the bulb 120 are then projected through the relay lens 111 onto the image dissector 112 which splits off the two images for use in an alignment servo system. A pair of 90° prisms, one on either side of the dissector 112, is used to direct images separately through a field lens 125, a relay lens 126, a field lens 127 and onto a roof prism 128 where the images are divided. Light from each line is reflected from a fixed mirror 129, there being a pair of mirrors for each of the two prisms. A chopper disc 130 is arranged to sequentially pass the light from one mirror and reflect the light from the other mirror onto one of a pair of phototubes 131.

In practice, the output of one photo tube 131 is adapted to control a film line servo motor 133 while the output of the other photo tube will control a prism rotation servo motor 132. It will be understood that when the registration mark on one side of the film is properly located the corresponding photocell 131 will cause the servo motor 133 to lock the film in position. Should the registration mark on the opposite side of the film not be aligned with the illuminating spot of light, then its corresponding photocell will cause the servo motor 132 to rotate the prism 107 through a suitable connecting arrangement such as the rack and pinion 135 shown in FIG. 2. By rotating the prism 107, the vertically oscillating scanning line from the cathode ray tube 100 will be rotated about the optic axis of the prism 107 until it is in a proper relative alignment with the sequence of characters on the film.

Referring again now to FIG. 1, assuming that the sequence of character on the film is properly oriented, the photomultiplier 119, which is receiving light from the "read" character, will provide video modulation for the display cathode ray tube 200. The output of the other photomultiplier provides information for electronic vertical alignment of the "next" character.

The "read" character presented on the display cathode ray tube 200 is identified by imaging it simultaneously onto a set of specially designed apertures masking a set of 37 photomultipliers 210 corresponding to 37 possible reference characters. The output of the photomultiplier behind each aperture is integrated over one complete video frame. If the integral exceeds a predetermined threshold, then the output is considered to be unity; if the integral does not exceed this threshold, then the output is considered to be zero. The combination of outputs from the various photomultipliers constitutes a binary number which identifies the character.

In the recognition system of FIG. 1, the outputs of the photomultipliers are amplified and fed into a set of 37 adders, level selectors and Schmitt triggers designated by the reference character 212. Logic circuitry 214 may be employed to convert inputs corresponding to filters to output corresponding to characters. This output thereupon is fed to a converter 216 in which the 37 "yes" or "no" input signals are converted to a pulse amplitude modulated output signal. The pulse height of such signal will correspond to the character recognized and there will be a total of 38 quantum levels of voltage. For example, assume that the title and number of a particular document is KCS5432 and that the corresponding film frame has come into register for identification, the electro-optical scanning section will first present the letter "K" on the face of the display cathode ray tube 200. The 37 signals from the photomultiplier array 210 will be processed and, in the channel corresponding to "K," a "yes" type pulse will appear. This pulse will now be converted into a predetermined voltage and a sequence of voltages corresponding to KCS5432 will be presented to a variable window 218.

Another sequence of voltages corresponding to the "correct" title of the document is generated in a patchboard 220 and fed through a multi-position commutator 222 to the window 218. The patchboard is preset before the reader is started by an operator who knows the correct title. As each character from the text enters the window, it is compared with the character that should occupy this place in the title. In like manner, the serial number is generated in a multicathode gas tube counter 224 which is indexed each time a frame is changed, and a correct serial number is presented to the window at the time when the serial number of the document is being read. If all the characters in both the title and serial number correspond to those that have been artificially generated, then a pulse is generated that moves the film to the next frame. Should they not correspond, an alarm 226 is energized and the reader is stopped to permit the operator to inspect the film and determine the source of trouble.

In practice, the window 218 generates a voltage one step higher than the input from the commutator 222 and gates the input to pass those pulses whose voltages lie between the upper and lower bounds. The window therefore will put out a pulse only if the input signal from the converter 216 falls in the gate.

The recognition portion of the system also includes a pulse detector 228 which has an input from the window 218 and provides a signal to a commutator advance 230, the stop alarm 226 and to a counter 232. The counter 232 tabulates the pulses to determine that the proper number are present, and generates a "verified" pulse of its own when all are counted. This "verified" pulse is then fed to a film advance section 234 which will bring the next frame of the film into position for scanning.

The film control system illustrated in block diagram in FIG. 3 serves to sense and accurately locate the film strip 110 until a particular line of text is read. Upon receipt of suitable commands, indicating that the line has been read, the film control system will advance the film to the succeeding line and the entire reading process will be repeated.

The system is organized about the film drive motor 133 which is controlled by a servo amplifier 400 and a bistable device 402 operating through a stop gate 404. In operation a film drive component 406, receiving an output from the optical system of FIG. 2 and feedback from the motor 133, cooperates with film position sensors 408, which include the phototubes 131 of FIG. 2, to feed a signal to the servo amplifier 400.

A contactor 410 is connected to this oscillating mirror 104 and provides a signal at the start of each scan. This signal is fed to a gate 412 which also receives a signal from a film position sensor 408. Assuming that the film is properly positioned, a pulse will be passed through the gate 412 to the bistable device 402 which will cause the stop gate to close, thereby locking the film drive as the line is scanned. Further assuming that the scanned sequence of characters are recognized, a verified pulse will be received from the recognition system of FIG. 1, converted to a stepped signal and fed to the servo amplifier 400. Simultaneously, the verified pulse will also be fed to the bistable device 402, causing the stop gate 404 to open and actuating the film drive motor 133 to advance the film.

In the embodiment of FIGS. 4 and 5, the system has been modified to handle opaque documents directly rather than indirectly and therefore avoids the necessity of microfilming the documents as required in the system of FIG. 2. In this embodiment, a vertically oscillating point of light scans the character printed on an opaque material with a display portion provided to measure the light reflected from the scanned character and present the characters sequentially on a cathode ray tube. As before, a recognition system will examine each displayed character and identify it. The electrical recognition signal, generated by the recognition systems may then be converted into a form suitable for the particular application of the reading machine involved. As in the previous embodiment, it will be assumed that the operator can select the type font to be used as well as the printing means so that all the characters will be allotted equal width spaces in the printed text and there will always be a blank space between adjacent characters.

Referring now to FIG. 4, a drum 300, rotatable about its center axis, is adapted to carry printed matter, in the form of documents, cards or the like, about its cylindrical outer surface. When the drum is rotated in the direction of the arrow by suitable driving means a succession of printed characters will be delivered in pairs through a field of view where they will be scanned by a high frequency scan such as that emitted by a cathode ray tube 304. The single point of light generated by the tube oscillates vertically and is divided into two beams by a prism 306. Each of these light beams is then passed through one of a pair of lenses 308 and onto an opaque character. In this fashion, two characters may be scanned simultaneously by a single scanning source. As an alternative to scanning with a point spot of light, the character may be uniformly illuminated but scanned optically in such a manner that the detecting means sees only the light from a small point on the character at any given time. In any event, the characters are scanned from top to bottom by a high frequency scan so that as the characters move from right to left through the field of view, there will be a succession of vertical scans through each character. These scans will start on the left hand edge of the character and proceed through to the right hand side. Passing over a blank space, they will then scan the succeeding character. The two beams of light will reflect in two different directions from the curved opaque surface with the reflective light from the scanning spot on the left (FIG. 4) striking one of a pair of photomultipliers 310 which, when connected to a system such as that suggested in FIG. 5, will modulate the intensity of the light output of a display cathode ray tube 312.

Through electronic processing by well known means, the signal of varying intensity, corresponding to varying reflections of the textual material, is converted into a two level signal. This two level electrical signal is transformed into a two level optical display on the cathode ray tube 312. One level corresponds to no light output at all while the other level corresponds to a uniform, high intensity light output. The height and width of the character displayed on the tube will be in the same ratio as the height and width of the actual characters. The horizontal deflection signal has a sawtooth wave form which is triggered the first time that a vertical scan intersects a character. This corresponds to the left hand edge of the character being read. The rise time of the sawtooth is such that a complete character can be plotted on the face of the display tube during one cycle of the sawtooth. The fall in voltage of the horizontal sawtooth component is timed to occur during the blank space between characters. After this voltage drop, the next vertical scan which intersects the character will trigger a new sawtooth and cause the succeeding character to be displayed on the cathode ray tube 312.

In order to shield the photomultiplier 310 from interference by extraneous light, it is desirable to mount a pair of truncated light cones 312 between the photomultiplier and the cylindrical surface of the rotating drum 300. These cones merge with one another near their apices with suitable apertures 314 provided to admit the oscillating light beams generated by the cathode ray tube 304. A narrow wall 316 divides the two cones along the line of intersection so that there will be no cross over of direct or reflected light from one side to the other. Preferably both cones have highly polished inner surfaces and, in the illustrated embodiment, are oriented approximately 40° from the optic axis of the tube 304. It will of course be understood that the cones 312 and wall 316 will be mounted as close to the drum as possible without actually touching it since the drum will be rotating relative to these members and a certain clearance will be necessary.

The reflected light from the "next" or adjacent character will fall upon the right hand photomultiplier which is connected to a system similar to that of FIG. 1 whereby the vertical position of the character can be examined prior to its display. By making the vertical scan of each character considerably larger than the height of the character it is possible to distinguish characters in spite of fairly large vertical misalignment.

During each cycle of the sawtooth wave responsible for the vertical deflection of the cathode ray tube, the output from the right hand scanning system is examined. By noting the points at which pulses occur, the bottom of the "next" character may be determined. During the following cycle when the same character is being scanned by the left hand scanning system, a vertical bias is introduced so that the bottom of the character, as determined during the previous cycle, will always be in the same place on the display tube 312. The character which is displayed on the face of the tube 312 will then be presented to a recognition system similar to that of the FIG. 1 embodiment.

It will be apparent that with either of the above systems considerable light amplification may be obtained by scanning the character with a small spot of light and displaying the text, one character at a time, on a cathode ray tube with magnification. The light amplification obtained is so great that it becomes possible to use a phosphor for a light source rather than carbon arc, thereby eliminating several bothersome electronic control problems. Furthermore, in both embodiments, the character will be presented in the same position on the display tube despite actual vertical misalignment of any character.

While the invention has been described with particular reference to the illustrated embodiments, a number of modifications may be made by those skilled in the art without departing from the spirit and scope of the invention.

Having thus described my invention, what I claim and desire to obtain by Letters Patent of the United States is:

1. Apparatus for recognizing alphanumeric characters appearing on a section of film, including a first cathode ray tube adapted to emit a single vertically oscillating beam of light, beam splitting means for dividing said single beam into a pair of beams, optical means for directing said pair of beams separately onto a pair of adjacent characters on said film, means for moving said beams laterally across said characters, optical means for separating the projected images of the illuminated characters, a second cathode ray tube adapted to display said characters sequentially on the face thereof, first photomultiplying means adapted to receive the projected image of one of said characters and provide video modulation for said second tube, position detecting and memory means having a connection with the vertical deflection plates of said second tube, and second photomultiplying means adapted to receive the projected image of the other of said images and providing an input to said position detecting and memory means whereby said other image may be located in a preselected vertical position when subsequently displayed on said second tube.

2. In a system for recognizing unknown alphanumeric characters appearing on a section of film by comparison with an array of known characters, means for enlarging said unknown character, comprising a first cathode ray tube adapted to generate a single oscillating beam of light, optical means for splitting said single beam into a pair of beams and directing them separately onto an adjacent pair of said characters, means for moving said characters in a direction normal to the planes of oscillation of said beams, a second cathode ray tube, first photo-detecting means adapted to receive the illuminated image of one of said characters and provide video modulation for said second tube whereby said character will be displayed on the face of said tube, position detecting and memory means connected to one pair of deflection plates in said second tube, second photo-detecting means adapted to receive the illuminated image of the other of said characters and provide an input to said memory means whereby said other character may be located in a pre-selected vertical position when subsequntly displayed on said second cathode ray tube.

3. A system for automatically recognizing alphanumeric characters appearing on a strip of film, comprising electro-optical means for scanning each of said characters sequentially, a cathode ray tube responsive to said scanning means and adapted to display each of said characters one by one, electro-optical detecting means adapted to detect and correct for misalignment of characters on said film whereby each of said characters will be located in a preselected position on the face of said cathode ray tube, photomultiplying means positioned to respond to characters displayed with said tube, an array of alphanumeric masks mounted over said photomultiplying means, means for imaging the character displayed on said tube through said masks and against said photomultiplying means, means for separately generating a series of electrical signals corresponding to a series of predetermined alphanumeric characters and electronic processing means for comparing electrical signals from said photomultiplying means with said artificially generated signals.

4. Apparatus for recognizing alphanumeric characters appearing on an opaque sheet, comprising a first cathode ray tube adapted to emit a single oscillating beam of light, beam splitting means for dividing said single beam into a pair of beams, optical means for directing each of said pair of beams separately onto a pair of adjacent characters on said sheet, means for moving said characters and said beam relative to one another in a direction normal to the planes of oscillation of said beams, a second cathode ray tube adapted to display said characters sequentially on the face thereof, first photomultiplying means adapted to receive the reflected image of one of said characters and provide video modulation for said second tube, position detecting and memory means having a connection with the vertical deflection plates of said second tube and second photomultiplying means adapted to receive the reflected image of the other of said characters and providing an input to said position detecting and memory means whereby said other character may be located in a preselected vertical position when subsequently displayed on said second tube.

5. Apparatus for recognizing alphanumeric characters appearing on an opaque sheet, comprising a support for said sheet, electro-optical means for simultaneously scanning a pair of adjacent characters, a cathode ray tube responsive to said scanning means and adapted to display said characters one by one, a pair of photomultiplying devices operatively connected to said cathode ray tube, one of said photomultiplying devices being adapted to receive reflected light from one of said scanned characters and provide video modulation for said cathode ray tube to display said one character, the other of said devices being adapted to receive the reflected light from the other of said scanned characters to detect the position of said other character and means responsive to said other device for positioning said other character on said tube in the same relative position as said first character.

References Cited by the Examiner

UNITED STATES PATENTS

| | | | |
|---|---|---|---|
| 2,685,615 | 8/54 | Biddulph | 340—146.3 |
| 2,785,388 | 3/57 | McWhirter | 340—146.3 |
| 2,817,480 | 12/57 | Baldwin | 340—146.3 |
| 2,905,927 | 9/59 | Reed | 340—146.3 |
| 2,919,425 | 12/59 | Ress et al. | |
| 2,934,436 | 4/60 | Burgett. | |
| 3,056,033 | 9/62 | Shepard | 250—219 |
| 3,085,227 | 4/63 | Brown | 340—146.3 |
| 3,118,129 | 1/64 | Fitzmaurice | 340—146.3 |

FOREIGN PATENTS

| | | |
|---|---|---|
| 1,177,728 | 12/58 | France. |

MALCOLM A. MORRISON, *Primary Examiner.*